May 4, 1954  D. C. GILLESPIE  2,677,448
ONE-WAY ENGAGING DEVICE
Filed Feb. 4, 1950  3 Sheets-Sheet 1
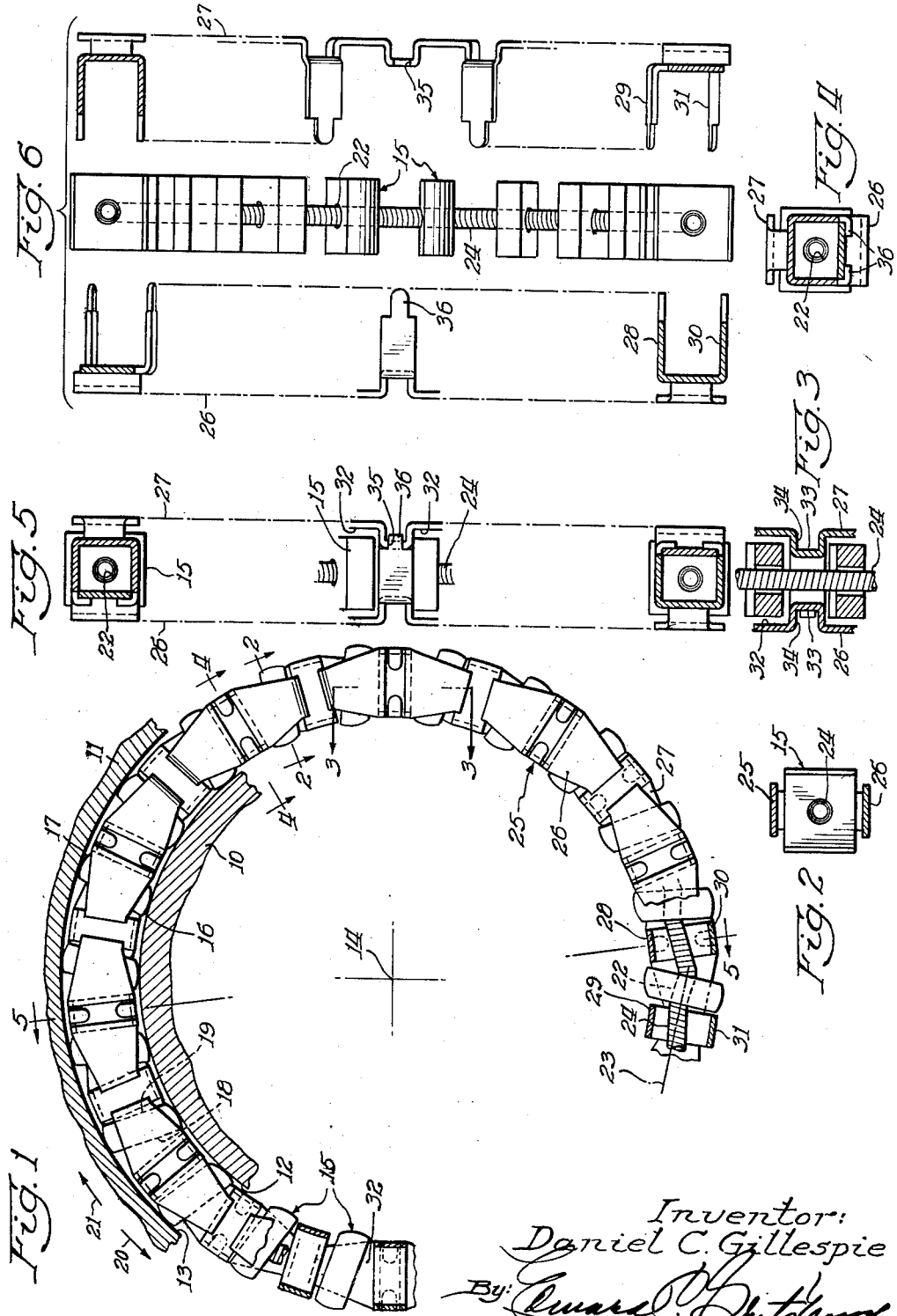
Inventor:
Daniel C. Gillespie May 4, 1954  D. C. GILLESPIE  2,677,448
ONE-WAY ENGAGING DEVICE
Filed Feb. 4, 1950  3 Sheets-Sheet 2
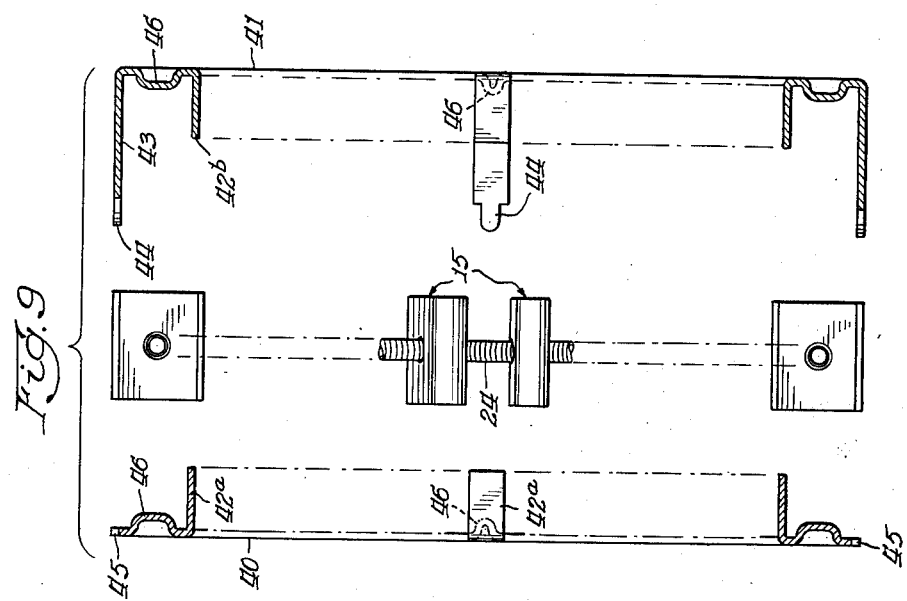
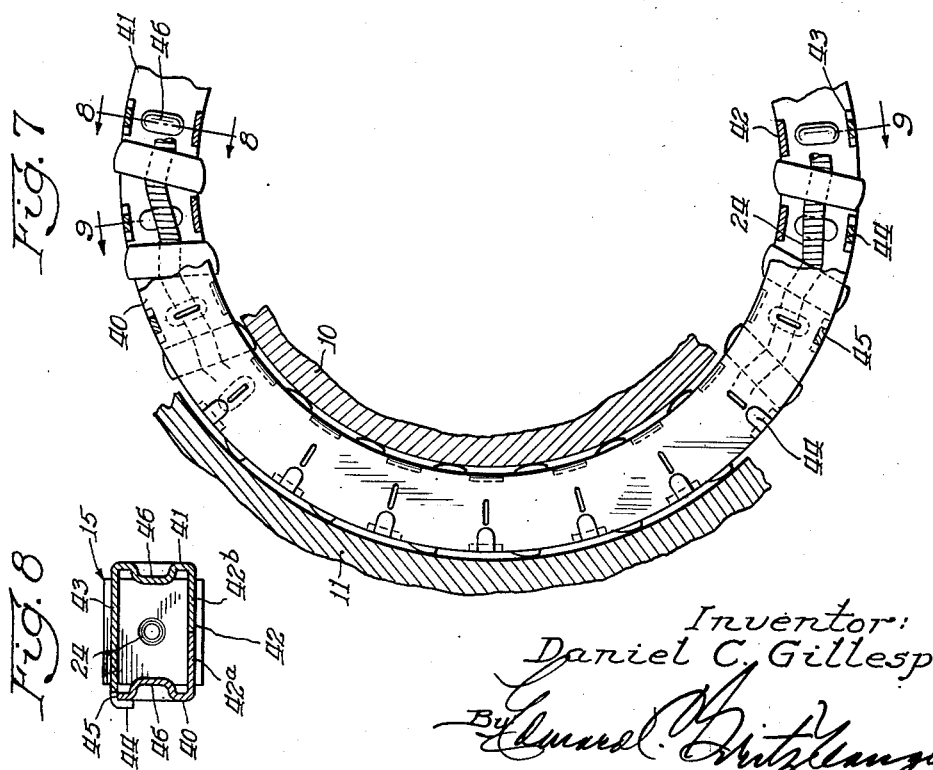
Inventor:
Daniel C. Gillespie May 4, 1954   D. C. GILLESPIE   2,677,448
ONE-WAY ENGAGING DEVICE
Filed Feb. 4, 1950   3 Sheets-Sheet 3
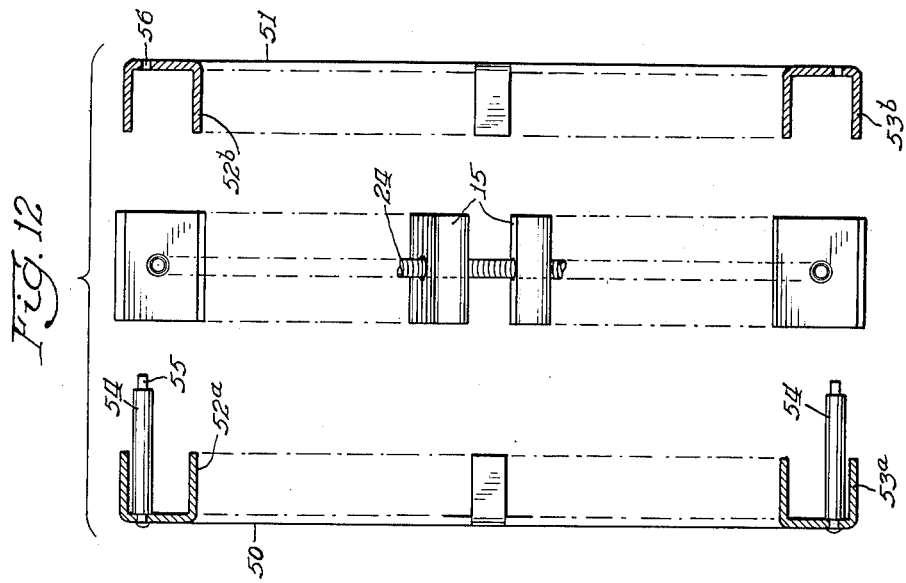
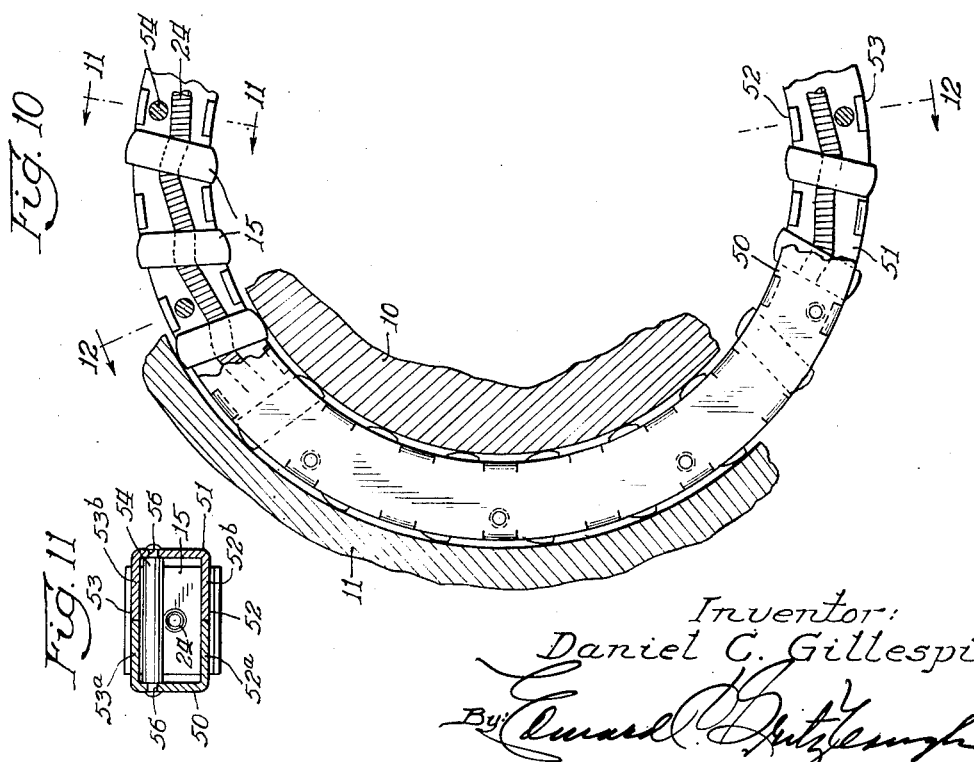
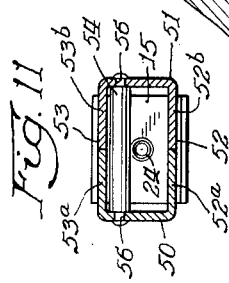

Patented May 4, 1954

2,677,448

UNITED STATES PATENT OFFICE 2,677,448

ONE-WAY ENGAGING DEVICE

Daniel C. Gillespie, Oak Park, Ill., assignor to Borg-Warner Corporation, Chicago, Ill., a corporation of Illinois Application February 4, 1950, Serial No. 142,413

12 Claims. (Cl. 192—45.1)

The invention relates to one-way engaging devices and more particularly to such devices of the tilting sprag or gripper type.

A one-way engaging device of this type generally comprises opposite coaxial races between which the tiltable sprags or grippers are disposed. The races generally are cylindrical and one is inner with respect to the other. The tiltable grippers or sprags have curved surfaces which contact and engage the inner and outer races on tilting of the sprags so as to engage the device. The tiltable sprags are generally held between the races by means of a cage, and the cage may be utilized for also holding the sprags in spaced relation with respect to each other.

It is an object of the invention to provide an improved one-way engaging device of this type having a sheet metal fabricated cage which may be easily and economically manufactured.

More particularly it is an object of the invention to provide an improved cage of this type made up of two sheet metal ring portions between which the sprags may be disposed which are connected by inner and outer cross portions that function to space the sprags with respect to each other and limit tilting of the sprags.

It is another object of the invention to utilize peripheral extensions of the ring portions for forming the cross portions each of which is integral with one of the ring portions and is mechanically fixed to the other ring portion for fixing the cage together.

It is a further object of the invention to provide an improved cage and sprag assembly which includes the cage having inner and outer cross portions, the sprags which are each provided with a central opening therethrough and a circular garter spring extending through the openings through the sprags and which extends between the inner and outer cross portions. The spring in this assembly holds the sprags in their proper places within the cage and from movement out of the cage, so that the assembly may be shipped as a unit and before assembly between races without any disassembly of the parts due to any jarring or rough handling in shipping.

The invention consists of the novel constructions, arrangements and devices to be hereinafter described and claimed for carrying out the above-stated objects and such other objects as will appear from the following description of the preferred embodiments of the invention, illustrated with reference to the accompanying drawings, wherein:

Fig. 1 is a fragmentary side elevational view of a one-way engaging device embodying the principles of the invention and including tiltable sprags disposed within a sprag cage;

Figs. 2, 3, 4 and 5 are sectional views taken respectively on lines 2—2, 3—3, 4—4 and 5—5 of Fig. 1 in the directions indicated;

Fig. 6 is an exploded sectional view of the sprag and cage assembly with the sprag cage disassembled;

Fig. 7 is a fragmentary side elevational view of another one-way engaging device constituting another embodiment of the invention and including tiltable sprags disposed within a cage;

Fig. 8 is a sectional view taken on line 8—8 of Fig. 7 in the direction indicated;

Fig. 9 is an exploded sectional view taken on line 9—9 of Fig. 7 in the direction indicated with the cage and sprags being disassembled;

Fig. 10 is a fragmentary side elevational view of another one-way engaging device constituting a third embodiment of the invention and including tiltable sprags disposed in a cage;

Fig. 11 is a sectional view taken on line 11—11 of Fig. 10 in the direction indicated; and Fig. 12 is an exploded sectional view of the sprag and cage assembly taken on line 12—12 of Fig. 10 in the direction indicated with the cage and sprags disassembled.

Like characters of reference designate like parts in the several views.

Referring now to Figs. 1 to 6, the one-way engaging device illustrated may be seen to comprise inner and outer members 10 and 11 provided respectively with an inner cylindrical race 12 and an outer, oppositely disposed, cylindrical race 13. The members 10 and 11 and their races 12 and 13 are coaxially disposed, having a common center indicated at 14.

A series of tiltable sprags or grippers 15 are disposed between the races 12 and 13, and each sprag 15 may be seen to have an inner arcuate race engaging surface 16, an outer arcuate race engaging surface 17, and flat side surfaces 18 and 19. The sprags 15 are tiltable, so that when the member 11 tends to rotate in the direction indicated by the arrow 20 with respect to the member 10, the sprags will rotate slightly in a counterclockwise direction as seen in Fig. 1 with their outer arcuate surfaces 17 tending to move along with the outer member 11 and will engage the races 12 and 13 and prevent such movement of the outer member 11. On the other hand, when the outer member 11 tends to rotate in the opposite direction as indicated by the arrow 21 with respect to the member 10, the sprags 15 will tilt slightly in the clockwise direction as seen in Fig. 1 with their outer arcuate surfaces 17 tending to move along with the outer race 13, and will allow such movement of the outer member 11.

Each of the sprags 15 has an opening 22 drilled through it which lies at a slight angle with respect to a center line 23 of the sprag extending at right angles with respect to the faces 18 and 19. A garter spring 24 extends through the opening 22 in each of the sprags, and the arrangement is such that when the sprags are in their potential engaging positions in contact with both of the races 12 and 13, the sprags 15 hold the spring flexed and in a wavy configuration as shown in Fig. 1, with the race engaging surfaces 16 and 17 of each of the sprags in contact under spring pressure with the races 12 and 13.

A cage 25 is provided for the sprags. The cage comprises a pair of ring portions 26 and 27 disposed between the races 12 and 13 and connected by inner cross portions 28 and 29 and outer cross portions 30 and 31. The inner and outer cross portions are radially disposed with respect to each other about the center 14 as is apparent from Fig. 1. The cross portions 28, 29, 30 and 31 define compartments 32 each for receiving one of said sprags 15, and the spring 24 extends between the two ring portions 26 and 27 and between the inner and outer cross portions, as shown. The cage 25 is formed from two sheet metal members, as shown in Fig. 6, each of which includes one of the ring portions and half of the cross portions formed integrally with the ring portions. The ring portion 26 is formed with extensions on its inner and outer edges which are bent to extend toward the other ring portion 27 and constitute the inner and outer cross portions 28 and 30. The ring portion 27 is similar in construction to the ring portion 26 and is formed with extensions which are bent to extend toward the other ring portion 26 and constitute the cross portions 29 and 31. As is apparent from Fig. 6, the cross portions 29 and 31 of the ring 27 alternate with the cross portions 28 and 30 of the ring 26 so as to form the compartments 32 for the sprags.

Each of the ring portions 26 and 27 is formed with inwardly extending projections 33 and channels 34 in its outer face. The projections 33 divide the compartments 32 from each other between the inner and outer cross portions 28, 29, 30 and 31, as is apparent from the drawing. The portions 33 are also provided with inner and outer notches 35 in the inner and outer peripheries of the ring portions 26 and 27, and the cross portions are provided with end tabs 36 which pass through the notches 35 and which are bent over into contact with the outer face of the opposite ring portion and into a channel 34 for fixing the ring portions together.

The cage and sprags are assembled by first spacing the sprags 15 equidistantly around the garter spring 24 and then moving the two rings 26 and 27 together with the cross portions 28 and 30 of the one ring and the cross portions 29 and 31 of the other ring spaced to form the compartments 32 and passing the tabs 36 through the opposite notches 35, with the garter spring 24 disposed between the inner cross portions 28 and 29 and the outer cross portions 30 and 31. The tabs 36 are then bent into the channels 34 and function to hold the ring portions 26 and 27 together to form the finished cage.

As so assembled, the cage functions to hold the sprags 15 in their proper spaced relation and for ready assembly between the members 10 and 11. The spring 24 which may contact any of the cross portions 28, 29, 30 and 31 prevents the individual sprags 15 from dropping out of the cage prior to assembly of the sprags and cage between the members 10 and 11, and the cross portions prevent excessive tilting of the sprags within their compartments 32. The projections 33 also function to prevent excessive tilting of the sprags, assuming that the sprags are moved out of their proper positions so that the sprags on tilting movement might pass under the cross portions 30 and 31 or over the cross portions 29 and 28. It is apparent from Fig. 3, for example, that the distance between the projections 33 in the opposite ring portions 26 and 27 is less than the width of the individual sprags so as to prevent excessive tilting of the sprags.

The cage shown in Figs. 7, 8 and 9 comprises sheet metal ring portions 40 and 41 for retaining the sprags 15 therebetween and in series relation between the members 10 and 11 and inner cross portions 42 and outer cross portions 43 of sheet metal extending between the ring portions. The cross portions 43 are formed integrally with the ring portion 41 and are provided with end tabs 44. The ring portion 40 is provided with notches 45 in its outer periphery for receiving the tabs 44, and the tabs 44 are bent inwardly along the outer face of the ring portion 40 for clamping the parts of the cage together. The inner cross portions 42 are formed by extensions 42a of the ring portion 40 at its inner periphery and extensions 42b of the ring portion 41 at its inner periphery which are bent out of the planes of the ring portions to make end to end contact. Each of the ring portions 40 and 41 are provided with a series of bosses 46 extending inwardly of the cage and disposed between the inner and outer cross portions 42 and 43 for purposes to be described.

The cage shown in these figures is assembled similarly to the cage shown in Figs. 1 to 6. The sprags 15 are disposed on the garter spring 24 in equally spaced relation, and the ring portions 40 and 41 are moved together to bring the extensions 42a and 42b into meeting contact at their ends to form the cross portions 42 and to bring the tabs 44 into the notches 45. The tabs 44 are then bent inwardly into contact with the outer face of the ring portion 40 to complete the sprag assembly. The cage shown in Figs. 7 to 9 functions in substantially the same manner as the cage shown in Figs. 1 to 6, and the inner and outer cross portions 42 and 43 function similarly to the inner and outer cross portions in the first embodiment to prevent undue tilting of the sprags 15. The bosses 46 act similarly to the projections 33 in preventing undue tilting of the sprags, assuming that the sprags are moved inwardly or outwardly sufficiently to pass under the outer cross portions 43 or over the inner cross portions 42 before the assembly of the sprags and cage between the members 10 and 11.

The gripper cage shown in Figs. 10 to 12 is quite similar in assembled condition to the gripper cages previously described and comprises the ring portions 50 and 51 similar to and for the same purposes as the ring portions 26, 27, 40 and 41 in the previous embodiments. The cage comprises inner cross portions 52 extending between the ring portions 50 and 51 and outer cross portions 53 also extending between the ring portions 50 and 51. The inner cross portions 52 are formed by extensions 52a integral with the ring portion 50 and extending from its inner periphery toward the other ring portion 51 and extensions 52b similarly disposed on the ring portion 51. The outer cross portions 53 are formed by extensions 53a integrally formed with the ring portion 50 at its outer periphery and extending toward the other ring portion 51 and extensions 53b similarly provided on the ring portion 51. The two ring portions 50 and 51 are fixed together by rivets 54 having reduced ends 55 which extend through openings 56 provided in the ring portions.

In the assembly of the gripper cage shown in Figs. 10 to 12, the sprags 15 are equidistantly disposed around the garter spring 24 as shown in Fig. 12, and the ring portions 50 and 51 are moved together to bring the extensions 52a and 52b in meeting contact at their ends and the extensions 53a and 53b into similar meeting contact, with the extensions being disposed between the sprags 15, and with the reduced end portions 55 of the rivets 54 being passed through the openings 56 in one of the ring portions. The rivets 54 may first be riveted within the openings 56 of the other ring portion prior to bringing the ring portions together, and the rivets at their other ends may then be riveted over to fix the cage together.

My improved one-way engaging devices advantageously include a sheet metal fabricated cage which may be easily and inexpensively manufactured. The ring portions and cross portions of the cages are preferably stamped sheet metal and the cross portions advantageously constitute extensions on the peripheries of the sheet metal ring portions. The parts of the first two cage embodiments of the invention advantageously are held together simply by end tabs on the cross portions, and the rivets 54 function to hold the third embodiment of the cage together. The inner and outer cross portions of these cages function to hold the sprags in spaced relation, and the projection 33 and bosses 46 in the first two embodiments function as additional means for holding the sprags spaced, even though they may move inwardly or outwardly far enough to pass over the inner cross portions or under the outer cross portions.

The one-way engaging devices each advantageously include a sprag and cage assembly, including in the first embodiment, for example, the sprags 15 and the cage 25. The sprags in each of these assemblies are held within the cage by means of the garter spring 24 which is held within the cage by the inner and outer spring spacing cross portions, the portions 28, 29, 30 and 31 in the first embodiment, for example, so that the sprags cannot come out of and separate from the cage. The sprags thus cannot be misplaced and lost in shipping or handling or in assembly and disassembly of the one-way devices as a whole and cannot be turned around so as to engage in the wrong direction with respect to other sprags in the assembly. The sprag and cage assemblies each constitute a unit which when once assembled may be shipped as an assembly for use in the final assembly between inner and outer races, and, inasmuch as the sprags cannot become disassociated from the cage, the person carrying out the final assembly of placing the sprags between the inner and outer races need not have the specialized training necessary for placing these sprags in the proper relationship with respect to each other. It is appreciated that the sprags look much the same from both sides, so that a person not acquainted with the detailed construction of them could easily assemble some of them reversely with respect to the others so that some would tend to engage for an opposite relative direction of rotation between the races with respect to the others. The sprag and cage assemblies cannot have any of their component parts thrown out of position, intentionally or otherwise, in shipping and assembly operations.

I wish it to be understood that my invention is not to be limited to the specific constructions, arrangements and devices illustrated and described, except only insofar as the claims may be so limited, as it will be apparent to those skilled in the art that changes may be made without departing from the principles of the invention.

I claim:

1. A cage for a one-way engaging device for retaining a series of grippers between opposite coaxial spaced gripping surfaces and comprising two spaced sheet metal ring portions adapted to retain the grippers therebetween and pairs of inner and outer sheet metal cross portions extending between said ring portions and adapted to separate the grippers from each other, at least one of the cross portions of each pair comprising an extension of one of said ring portions and extending to the opposite ring portion and having a tab on its end bent over said last-named ring portion for fixing the cage together.

2. A cage for a one-way engaging device for retaining a series of tiltable grippers between opposite coaxial spaced gripping surfaces and comprising two spaced ring portions adapted to have the grippers disposed therebetween, pairs of inner and outer cross portions extending between said ring portions and adapted to separate the grippers from each other, each of said ring portions being provided with a series of projections extending toward the other ring portion and disposed between said inner and outer cross portions which with the cross portions function to limit tilting of the grippers, and means for holding said ring and cross portions fixed with respect to each other.

3. A cage for a one-way engaging device for retaining a series of grippers between opposite coaxial spaced gripping surfaces and comprising two spaced sheet metal ring portions adapted to have the grippers disposed therebetween, pairs of inner and outer sheet metal cross portions extending between said ring portions and adapted to separate the grippers from each other, the inner and outer cross portions of each pair being substantially radially disposed with respect to each other, said ring portions each being formed with projections disposed between said inner and outer cross portions and extending toward the opposite ring portion which with the cross portions limit tilting of the grippers, and means for holding said ring and cross portions fixed with respect to each other.

4. A cage for a one-way engaging device for retaining a series of grippers between opposite coaxial spaced gripping surfaces and comprising two sheet metal spaced ring portions adapted to retain the grippers therebetween, pairs of inner and outer sheet metal cross portions extending between said ring portions and adapted to separate the grippers from each other, alternate inner cross portions and alternate outer cross portions constituting extensions of one of said ring portions and the other outer and inner cross portions constituting extensions of the other ring portion, and means for holding said ring and cross portions fixed with respect to each other.

5. A cage for a one-way engaging device for retaining a series of grippers between opposite coaxial spaced gripping surfaces and comprising two sheet metal spaced ring portions adapted to retain the grippers therebetween and pairs of inner and outer sheet metal cross portions extending between said ring portions and adapted to separate the grippers from each other, alternate pairs of cross portions constituting extensions from the inner and outer peripheries of one of the ring portions and the other cross portions constituting extensions of the inner and outer peripheries of the other ring portion, each of said extensions having a tab on its end bent over the ring portion to which the extension extends for fixing the cage together.

6. A cage for a one-way engaging device for retaining a series of grippers between opposite coaxial spaced gripping surfaces and comprising two sheet metal spaced ring portions adapted to retain the grippers therebetween and pairs of inner and outer sheet metal cross portions extending between said ring portions and adapted to separate the grippers from each other, said outer cross portions constituting extensions on the outer periphery of one of said ring portions and extending to the opposite ring portion and having end tabs bent over the latter ring portion for fixing the cage together and said inner cross portions constituting extensions formed on both of said ring portions and in meeting relationship at their ends between said ring portions.

7. In a sprag and cage assembly for a one-way engaging device having inner and outer races, the combination of a series of sprags adapted to be disposed between the inner and outer races of the engaging device and adapted to be tilted in one direction to engage the races against relative rotation, a cage for the sprags comprising two sheet metal ring portions on opposite sides of the sprags and inner and outer sheet metal cross portions comprising extensions of said ring portions and disposed between each two adjacent sprags, each of said cross portions extending between said ring portions for holding said sprags in spaced relation and means for holding said ring and cross portions fixed with respect to each other, and means for retaining said sprags within said cage when the sprags and cage are disassembled from the races.

8. In a sprag and cage assembly for a one-way engaging device having inner and outer races, the combination of a series of sprags adapted to be disposed between the inner and outer races of the engaging device and adapted to be tilted in one direction to engage the races against relative rotation, a cage for the sprags comprising two ring portions on opposite sides of the sprags and inner and outer cross portions between each two adjacent sprags extending between said ring portions for holding said sprags in spaced relation and means for holding said ring and cross portions fixed with respect to each other, said ring portions being formed with projecting portions extending between said sprags and disposed between said inner and outer cross portions which with the cross portions limit tilting of the sprags, and a garter spring extending through said sprags and between the inner and outer cross portions disposed between each two adjacent sprags for holding the sprags within the cage when the sprags are disassembled from the races and tending to engage the sprags with the races when the sprags are assembled between the races.

9. In a sprag and cage assembly for a one-way engaging device having inner and outer races, the combination of a series of sprags adapted to be disposed between the inner and outer races of the engaging device and adapted to be tilted in one direction to engage the races against relative rotation, a cage for the sprags comprising two ring portions of sheet metal on opposite sides of the sprags, each of said ring portions having cross portions constituting extensions of the inner and outer peripheries thereof, said cross portions extending between alternate pairs of sprags to the other ring portion and being fastened at their ends to the latter ring portion for holding the ring portions together and holding said sprags in spaced relation, and a garter spring extending through said sprags and adapted to contact said cross portions for holding the sprags within the cage when the sprags are disassembled from the races and tending to engage the sprags with the races when the sprags are assembled between the races.

10. In a sprag and cage assembly for a one-way engaging device having inner and outer races, the combination of a series of sprags adapted to be disposed between the inner and outer races of the engaging device and adapted to be tilted in one direction to engage the races against relative rotation, a cage for the sprags comprising a ring portion on one side of the sprags, inner cross portions comprising extensions of the inner periphery of said ring portion and bent at right angles thereto so as to extend from said ring portion and between certain adjacent sprags, outer cross portions comprising extensions of the outer periphery of said ring portion and bent at right angles thereto so as to extend from said ring portion and between certain adjacent sprags and means on the opposite side of said sprags joining certain of said inner and outer cross portions, and a garter spring extending through each of said sprags and between said inner and outer cross portions and between said ring portion and said means joining said cross portions on the opposite side of the sprags for holding the sprags within the cage when the sprags are disassembled from the races.

11. A sprag and cage assembly for a one-way engaging device in accordance with claim 7 wherein the cross portions are each formed by an extension on each of said ring portions and are disposed in meeting relationship at their ends.

12. A sprag and cage assembly for a one-way engaging device in accordance with claim 7 wherein each of said cross sections is made up of extensions on the two ring portions bent to bring their ends into meeting relationship, and including a series of rivets for fixing the two ring portions together.

References Cited in the file of this patent

UNITED STATES PATENTS

| Number | Name | Date |
| --- | --- | --- |
| 1,466,689 | Bower | Sept. 4, 1923 |
| 1,752,616 | Ryan | Apr. 1, 1930 |
| 1,915,118 | Brown | June 20, 1933 |
| 2,113,722 | Dodge | Apr. 12, 1938 |
| 2,404,221 | Dodge | July 16, 1946 |
| 2,599,793 | Warner | June 10, 1952 |

FOREIGN PATENTS

| Number | Country | Date |
| --- | --- | --- |
| 876,799 | France | Jan. 3, 1941 |